United States Patent [19]

Kitagawa et al.

[11] Patent Number: 5,183,856
[45] Date of Patent: Feb. 2, 1993

[54] THERMOPLASTIC ELASTOMER AND A PROCESS FOR ITS PRODUCTION

[75] Inventors: Sadao Kitagawa; Mitushige Baba, both of Yokkaichi, Japan

[73] Assignee: Mitsubishi Petrochemical Company Limited, Tokyo, Japan

[21] Appl. No.: 659,504

[22] Filed: Feb. 22, 1991

[30] Foreign Application Priority Data

Feb. 23, 1990 [JP] Japan ............................. 2-42774
Feb. 23, 1990 [JP] Japan ............................. 2-42775
Apr. 18, 1990 [JP] Japan ............................ 2-102138

[51] Int. Cl.$^5$ ..................... C08F 265/04; C08L 33/08
[52] U.S. Cl. ............................. 525/282; 525/267; 525/205
[58] Field of Search .......................... 525/205, 282

[56] References Cited

U.S. PATENT DOCUMENTS

| | | | |
|---|---|---|---|
| 3,153,014 | 10/1964 | Flecther et al. | 525/282 |
| 3,458,603 | 7/1969 | Griffin et al. | 525/282 |
| 3,843,753 | 10/1974 | Owens | 525/282 |
| 4,696,978 | 9/1987 | Dean | 525/282 |
| 4,774,291 | 9/1988 | Maeda | 525/205 |
| 4,876,313 | 10/1989 | Lorah | |

FOREIGN PATENT DOCUMENTS

| | | | |
|---|---|---|---|
| 876774 | 7/1971 | Canada | 525/82 |
| 0234766 | 9/1987 | European Pat. Off. | |
| 61-195148 | 8/1986 | Japan | 525/82 |
| 61-1195149 | 8/1986 | Japan | 525/82 |
| 2213826 | 8/1989 | United Kingdom | |

Primary Examiner—Carman J. Seccuro, Jr.
Attorney, Agent, or Firm—Wegner, Cantor, Mueller & Player

[57] ABSTRACT

A thermoplastic elastomer comprising 55-90 parts by weight of a crosslinked acrylic rubber having a glass transition temperature of 0° C. or lower and 45-10 parts by weight a copolymer of a methacrylate ester with a maleimide, which has a glass transition temperature of 110° C. or higher. This thermoplastic elastomer may be produced by a first step of polymerizing an acrylic ester in the presence of a polyfunctional monomer with or without a chain transfer agent and a second step of adding a methacrylate ester and a maleimide to the resulting acrylic rubber to carry out copolymerization.

9 Claims, 2 Drawing Sheets

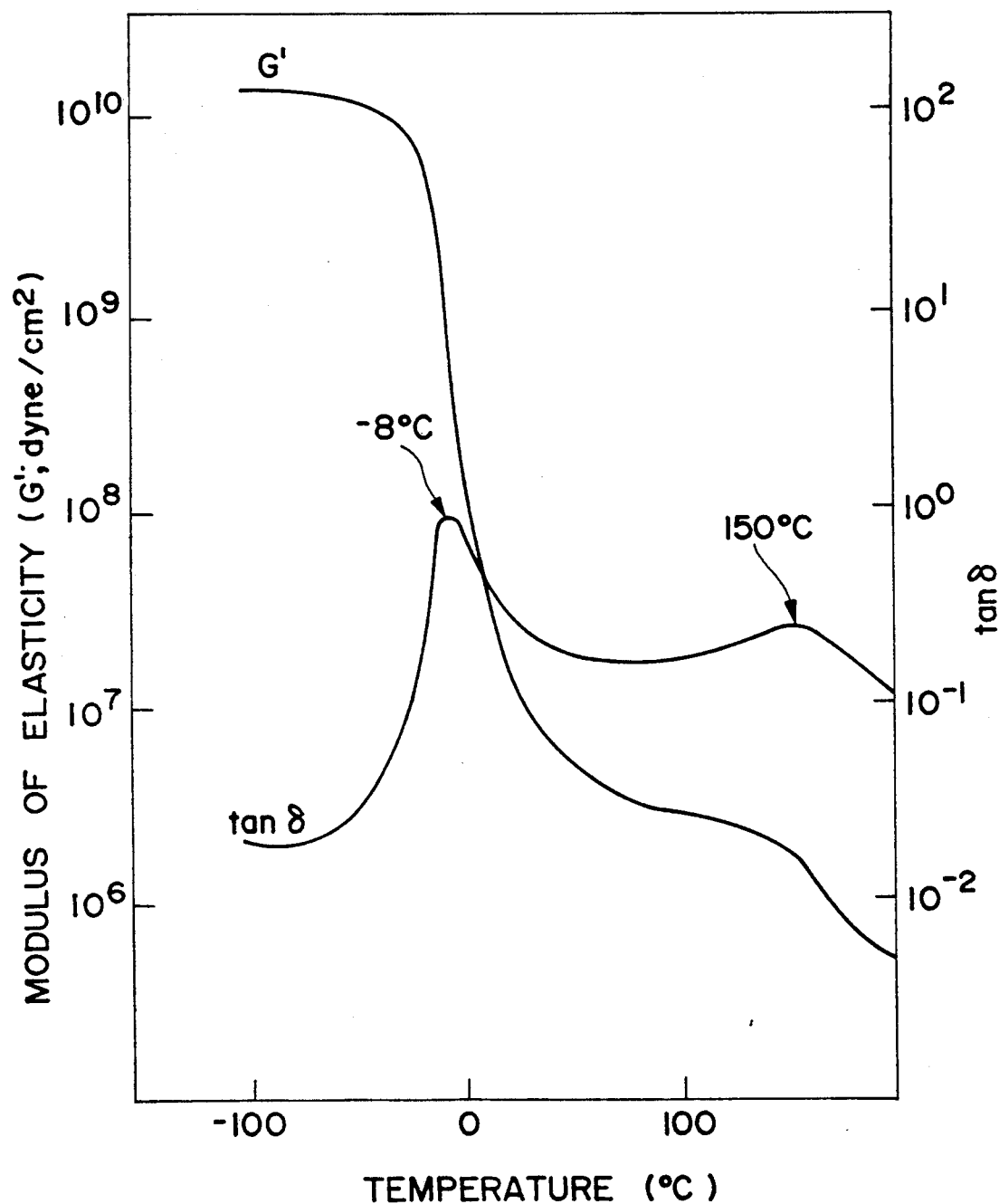
F I G . 1

THERMOPLASTIC ELASTOMER AND A PROCESS FOR ITS PRODUCTION

BACKGROUND OF THE INVENTION

1. Field of the Art

This invention relates to a novel thermoplastic elastomer comprising a crosslinked acrylic rubber component and a copolymer component of a methacrylate ester with a maleimide, which excels in heat resistance and oil resistance, is soft or flexible, has an increased tensile strength and shows an improved moldability, and to a process for producing such a thermoplastic elastomer.

2. Background Art

Thermoplastic elastomers show rubber elasticity in the range of temperatures at which they are used but, unlike the so-called vulcanized rubbers, provide a high-molecular or polymeric material capable of being melt-molded at elevated temperatures. In other words, thermoplastic elastomers have the properties of both vulcanized rubbers and thermoplastic resins. Due to this character, they have recently been in great demand and so mass-produced.

Various such thermoplastic elastomers, now commercially available, are generally broken down into olefin, styrene, vinyl chloride, urethane, ester and amide types, based on their chemical structures or compositions of components.

Because of lower total cost than vulcanized rubber, there is a demand to use such thermoplastic elastomers instead of vulcanized rubber products where they are likely to be exposed to high temperature and come into contact with oils and fats.

The thermoplastic elastomers so far known in the art have some heat resistance, however, they fail to meet the above demand due to their problems that some are poor in oil resistance (e.g. olefin type); some excel in oil resistance but are poor in heat resistance (e.g. vinyl chloride and urethane types); or some excel in resistance to heat and oils in a hard region but are poor in resistance to oils and heat in a soft region like vulcanized rubbers (e.g. ester and amide types).

On the other hand, copolymers of alkyl esters of acrylic acid with a small amount of other monomer such as chloroethyl vinyl ether or ethylidene norbornene—which provides crosslinking points during vulcanization—are well known as acrylic rubbers, which are kneaded with a crosslinking agent by rolls or the like for practical use.

Further, it is known from Japanese Patent Publication No. 43(1968)-9753, that copolymers obtained by the copolymerization of maleimides with methyl methacrylate are superior in heat resistance to homopolymers of methyl methacrylate.

Also well-known are compositions of copolymers of methyl methacrylate with maleimides, to which acrylic rubber is added to improve the impact resistance of said copolymers (see, for instance, Japanese Patent Publication No. 43(1968)-9753 and Japanese Patent Kokai Koho No. 62(1987)-132911).

These conventional compositions, however, all fail to have both heat resistance and oil resistance in a soft region, partly because the content of acrylic rubber is limited.

Japanese Patent Kokai No. 62(1987)-132911 teaches that difficulty is encountered in the copolymerization of methyl methacrylate with maleimides at an acrylic rubber content of higher than 50% and that the resulting copolymer compositions, if obtained, are poor in heat resistance.

Japanese Patent Kokai No. 62(1987)-209113 teaches that the polymerization of a mixture of methyl methacrylate, an N-substituted maleimide, an alkyl acrylate and a difunctional monomer yields an interpolymer having both a glass transition temperature based on the alkyl polyacrylate and a glass transition temperature based on the copolymer of methyl methacrylate with the N-substituted maleimide. However, since it is taught that the polymeric moiety corresponding to the polyacrylic ester of this interpolymer should have a molecular weight in the range of 150,000 to 500,000, as measured by GPC, it is obvious that this polyacrylic ester component is soluble in a solvent and is not crosslinked.

Moreover, as illustrated in FIG. 2, a confirmatory experimentation carried out by the inventors (see Comparative Example 1 referred to later) also teaches that, where the acrylic ester content exceeds 50%, the single-stage polymerization effected according to what is set forth in said publication yields a polymer product found to have a single glass transition temperature lying midway between the glass transition temperature (Tg) of the copolymer of methyl methacrylate with the N-substituted maleimide and the Tg of the polyacrylic ester, as determined by the measurement of its viscoelasticity. Thus, that polymer product does not behaves as a thermoplastic elastomer at all.

Thus, in the above-mentioned prior art, there is no teaching or suggestion of thermoplastic elastomers comprising a crosslinked acrylic rubber component and a copolymeric component of a methacrylate ester with a maleimide, which have both heat resistance and oil resistance.

A novel thermoplastic elastomer which has both heat resistance and oil resistance not only in a relatively hard region but also in a soft vulcanized rubber region and has an improved moldability, as well as a process for its production, are still in great demand as an alternative to vulcanized rubber products for uses where it is likely to be exposed to elevated temperatures and come into contact with oils and fats.

SUMMARY OF THE INVENTION

In view of the foregoing, the inventors have made extensive and intensive studies to obtain a novel thermoplastic elastomer taking full advantage of high heat aging temperature and good oil resistance that acrylic rubber have and a high glass transition temperature, a high heat aging temperature and good oil resistance that copolymers of methacrylate esters with maleimides possess, and have consequently found that a thermoplastic elastomer enabling the object of this invention to be achieved can be obtained by carrying out polymerization of the respective monomers in a specific manner and forming the corresponding polymers at a specific quantitative ratio.

Thus, according to one aspect of this invention, there is provided a thermoplastic elastomer comprising 55-90 parts by weight of an acrylic rubber having a glass transition temperature of 0° C. or lower and 45-10 parts by weight of a copolymer of a methacrylate ester with a maleimide, which has a glass transition temperature of 110° C. or higher.

According to another aspect of this invention, there is provided a process for producing a thermoplastic elastomer which comprises polymerizing an acrylic ester in the presence of a polyfunctional monomer having at least two ethylenically unsaturated bonds in its molecule, thereby forming a crosslinked acrylic rubber having a glass transition temperature of 0° C. or lower in an amount of 55-90 parts by weight per 100 parts by weight of the final polymer composition, and then adding a methacrylate ester and a maleimide to the acrylic rubber so as to carry out copolymerization, thereby forming a methacrylate ester/maleimide copolymer having a glass transition temperature of 110° C. or higher in an amount of 45-10 parts by weight per 100 parts by weight of the final polymer composition.

The thermoplastic elastomer of this invention comprising 55-90 parts by weight of a crosslinked acrylic rubber and 45-10 parts by weight of a methacrylate ester/maleimide copolymer has improved heat resistance and oil resistance over hard to soft regions, and excels in moldability as well.

Thus, an ester or amide type thermoplastic elastomer heretofore known as a thermoplastic elastomer resistant to heat and oils, with a hardness of 80 or lower as measured according to JIS-K 6301A, generally shows a degree of swelling of 160% or higher or, at worst, 240% or higher, upon immersed in JIS-No. 3 oil at 125° C. for 72 hours. In contrast thereto, the thermoplastic elastomer of the present invention shows a degree of swelling of 30% or lower even in a wide hardness range from 95 to 40; this means that they excel in resistance to heat and oils.

BRIEF DESCRIPTION OF THE DRAWINGS

FIG. 1 illustrates the temperature dependences of the modulus of elasticity (G') and tan δ of a thermoplastic elastomer obtained in Example 2.

DETAILED DESCRIPTION OF THE INVENTION

[I] Thermoplastic Elastomer (1) Structure

Figure 2:
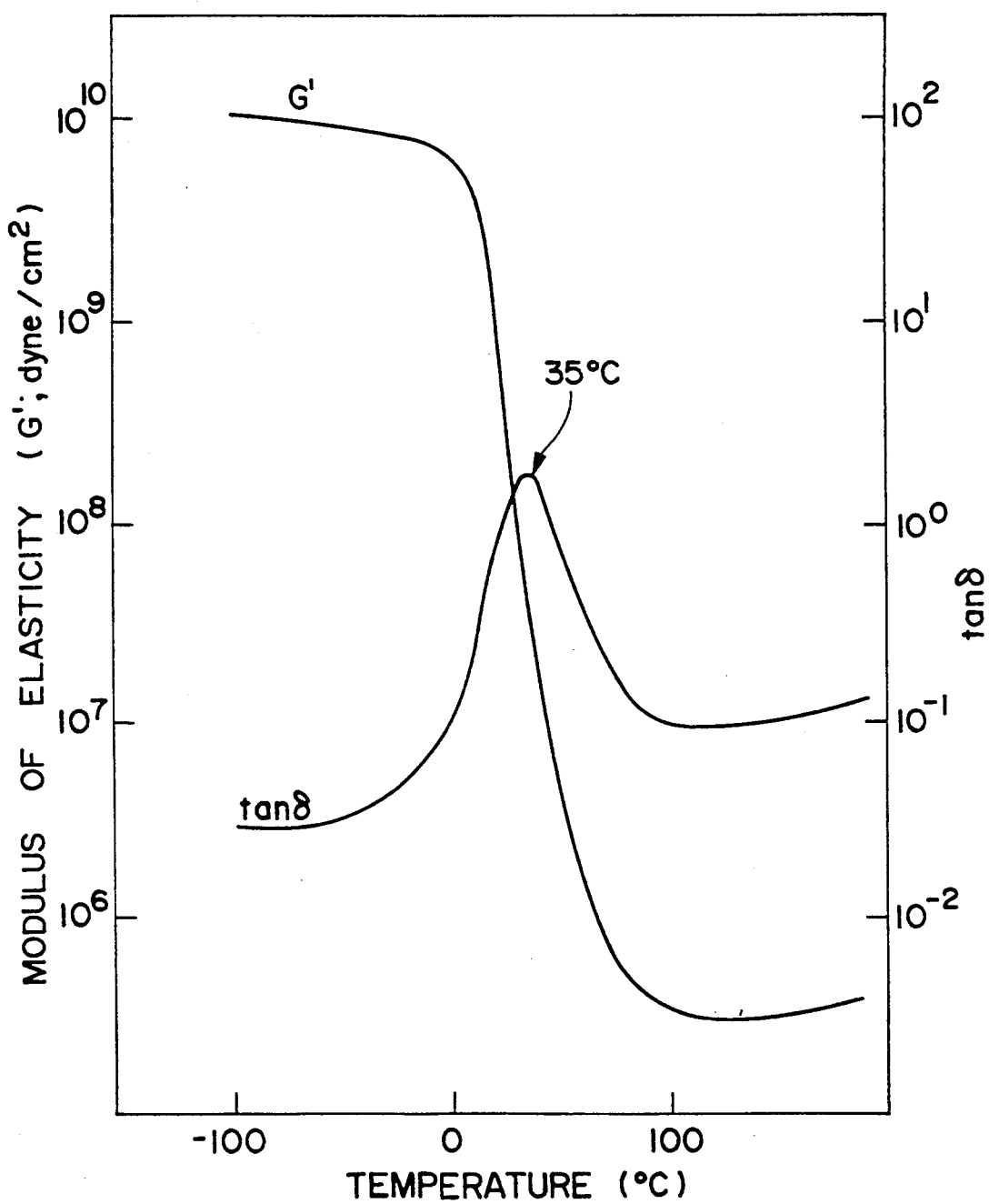
FIG. 2 illustrates the temperature dependences of the modulus of elasticity (G') and tan δ of a copolymer product obtained in one Comparative Example 1.

Basically, the thermoplastic elastomer of the present invention comprises 55-90 parts by weight of a crosslinked acrylic rubber component having a glass transition temperature of 0° C. or lower and 45-10 parts by weight of a copolymer component of a methacrylate ester with a maleimide, which has a glass transition temperature of 110° C. or higher.

(2) Production

As long as the object of the present invention is attained, the thermoplastic elastomer of the present invention may be produced by any one of desired processes. Mention, for instance, is made of the following three processes.

Process (i) wherein an uncrosslinked acrylic rubber obtained by the polymerization of an acrylic ester is pulverized after crosslinking, and is then melt-kneaded with a methacrylate ester/maleimide copolymer;

process (ii) wherein an uncrosslinked acrylic rubber obtained by the polymerization of an acrylic ester and a methacrylate ester/maleimide copolymer are hot-kneaded together with a crosslinking agent for crosslinking said acrylic rubber selectively; and process (iii) which involves a first step of polymerizing an acrylic ester in the presence of a polyfunctional monomer, thereby effecting simultaneous crosslinking of the polymer, and a second step of adding a methacrylate and a maleimide to the crosslinked polymer product for further copolymerization. Among these processes, preference is given to process (iii) —the polymerization of an acrylic ester concurrent with the crosslinking of the polymer, since the particle size of the crosslinked acrylic rubber can be reduced. Process (iii) will now be explained in greater detail.

(a) Preparation of Crosslinked Acrylic Rubber (First Step)

I] Starting Materials

1) Acrylic Ester

The acrylic ester used at the first step of preparing the crosslinked acrylic rubber in the process for producing thermoplastic elastomers according to the present invention is an ester of acrylic acid with an alcohol component having 1-15, preferably 2-10, more preferably 2-8 carbon atoms.

Preferable examples of such acrylic esters are ethyl acrylate, n-propyl acrylate, i-propyl acrylate, n-butyl acrylate, i-butyl acrylate, n-amyl acrylate, n-hexyl acrylate, 2-ethylhexyl acrylate, n-octyl acrylate, n-dodecyl acrylate, 2-methoxyethyl acrylate, 2-ethoxyethyl acrylate, 2-methoxypropyl acrylate, 3-methoxypropyl acrylate, 2-hydroxyethyl acrylate, 2-hydroxypropyl acrylate, 2-chloroethyl acrylate, 2-cyanoethyl acrylate and glycidyl acrylate. The most preferred are ethyl acrylate, n-propyl acrylate, n-butyl acrylate, n-amyl acrylate, 2-methoxyethyl acrylate, 2-ethoxyethyl acrylate and 2-cyanoethyl acrylate. These acrylic esters may be used alone or in combination of two or more.

The acrylic ester or esters may be used in combination with a monomer copolymerizable therewith such as 2-chloroethyl vinyl ether, allyl glycidyl ether, ethylidene norbornene, acrylic acid, methacrylic acid, maleic acid or glycidyl methacrylate in such an amount that the effect of this invention is achievable, preferably in an amount up to 10% by weight.

2) Polyfunctional Monomer

The polyfunctional monomer, in the presence of which the acrylic ester is to be polymerized, is a compound having in its molecule at least two ethylenically unsaturated bonds copolymerizable with the acrylic ester. Specific examples of such polyfunctional monomers are difunctional monomers such as divinylbenzene, divinyltoluene, diacrylate or dimethacrylate esters of diols (diols including ethylene glycol, diethylene glycol, tetraethylene glycol, 1,4-butanediol, 1,6-hexanediol, propylene glycol, 1,4-cyclohexanediol and 1,4-dimethylolcyclohexane), allyl acrylate, allyl methacrylate, diallyl esters of dicarboxylic acids (dicarboxylic acids including maleic, fumaric, phthalic, adipic and succinic acids); trifunctional monomers such as trivinyltoluene, triacrylate or trimethacrylate esters of triols (triols including glycerin and trimethylolpropane) and triallyl esters of tricarboxylic acids, e.g. pentaerythritol triacrylate, triallyl cyanurate, triallyl isocyanurate and triallyl trimelitate; tetrafunctional monomers such as tetraacrylate or tetramethacrylate esters of tetraols, e.g. tetramethylolmethane, and tetraallyl esters of tetracarboxylic acids, e.g. tetraallyl pyromellitate; or hexafunctional monomers such as dipentaerythritol hexacrylate. Among these polyfunctional monomers, the tri- and tetra-functional monomers are preferred, but the most preference is given to the trifunctional monomers. The polyfunctional monomers may be used alone or in combination with two or more.

3) Chain Transfer Agent

If required, a chain transfer agent may be used in combination with the polyfunctional monomer. Use may be made of any chain transfer agent usually added with a view to reducing the molecular weight of polymers prepared by radical polymerization. More specifically, mention is made of compounds containing hydrogen at their benzyl positions such as diphenylmethane and triphenylmethane; α-methylstyrene dimers; halogenated hydrocarbons such as chloroform, carbon tetrachloride and carbon tetrabromide; ketones such as acetone, methyl ethyl ketone and cyclohexanone; carboxylic acids such as acetic acid; esters such as ethyl acetate; carboxylic acid amides such as dimethylacetamide and dimethylformamide; and mercaptans such as n-butyl mercaptan, n-decyl mercaptan, n-dodecyl mercaptan, t-dodecyl mercaptan, hydroxyethyl mercaptan and thioglycollic acid. Among these, the mercaptans are preferred. These chain transfer agents may be used alone or in combination of two or more.

4) Radical Polymerization Catalyst

Use may be made of radical polymerization catalysts so far known in the art, which are illustratively represented by inorganic peroxides such as potassium persulfate and ammonium persulfate; organic peroxides such as p-menthane hydroperoxide, cumene hydroperoxide and benzoyl peroxide; azo compounds such as azobisisobutyronitrile; and the so-called redox initiators comprising a combination of oxidizing substances such as the above peroxides and azo compounds and ferric salts with reducing substances such as ammonia, amines, sodium hydrosulfite, sodium formaldehyde sulfoxylate and ascorbic acid.

II] Preparation

For the polymerization and crosslinking of acrylic esters, an acrylic ester and a polyfunctional monomer, optionally together with a chain transfer agent at need, may be subjected to heterogeneous polymerization using water as a medium, i.e. suspension or emulsion polymerization in an aqueous medium, in the presence of a radical polymerization catalyst. In view of the physical properties of the resultant product, it is preferable to use the emulsion polymerization.

The polyfunctional monomer is used in an amount of usually 0.01-10 parts by weight, preferably 0.1-7 parts by weight, more preferably 0.2-5 parts by weight based on 100 parts by weight of the acrylic ester so as to ensure that the gel fraction content of the resultant acrylic rubber is 70% or more, preferably 80% or more, more preferably 90% or more. Usually, the optimum amount of the polyfunctional monomer, which varies depending upon its type, decreases as the ethylenically unsaturated bond copolymerizable with the acrylic ester increase in number. Lower and larger amounts of the polyfunctional monomer are unpreferred, since difficulty would be encountered in obtaining a gel fraction of 70% or higher at lower than 0.01 part by weight, while the resulting polymer would have a poor rubber elasticity or the moldability of the resulting thermoplastic elastomer product would be seriously deteriorated at higher than 10 parts by weight.

Although depending upon its type, the amount of the chain transfer agent, which may be optionally used, is usually in the range of 0.001 to 10 parts by weight per 100 parts by weight of the acrylic ester. At less than 0.001 part by weight, the chain transfer agent is so unlikely to produce its own effect that the resulting thermoplastic elastomer is hardly improved in terms of moldability. Use of the chain transfer agent in an amount exceeding 10 parts by weight, on the other hand, is unpreferred because of a sharp drop of the rate of polymerization of the acrylic ester or some degradation of the physical properties of the resulting thermoplastic elastomer, e.g. an increase in compression set. When marcaptans are used as a chain transfer agent, they should preferably be used in an amount in the range of 0.01-1 part by weight. Other chain transfer agents may be used usually in the range of 0.02-10 parts by weight, slightly larger than the amounts considered preferable for mercaptans.

The quantity of the radical polymerization catalyst used is in the range of generally 0.001-5 parts by weight, preferably 0.005-1 part by weight per 100 parts by weight of the acrylic ester.

As already mentioned, the suspension or emulsion polymerization method is used in the present invention. The emulsion polymerization, for instance, may be carried out under the following conditions. The above described amounts of the polyfunctional monomer, chain transfer agent and water-soluble radical polymerization catalyst, 50-500 parts by weight, preferably 100-300 parts by weight of water, 0.1-15 parts by weight, preferably 0.5-10 parts by weight of an emulsifier such as a sodium higher alkyl sulfate and 0-5 parts by weight of an emulsion stabilizer such as sodium sulfate are added to 100 parts by weight of the acrylic ester, and polymerization is carried out at a temperature of usually 0°-100° C., preferably 0°-90° C., more preferably 0°-30° C. under a pressure of generally 0-10 kg/cm² gauge, preferably 0-5 kg/cm² gauge for a period of time of 1-10 hours.

The acrylic ester, polyfunctional monomer, chain transfer agent and radical polymerization catalyst may be fed to a reactor in bulk, in perportions or in continuous manners.

The crosslinked acrylic rubber obtained by such polymerization as mentioned above has a glass transition temperature of 0° C. or lower, preferably −10° C. or lower, more preferably −20° C. or lower.

Such an acrylic rubber is crosslinked to a gel fraction content of at least 70%, preferably at least 80%, more preferably about 90-100%.

The gel fraction content of crosslinked acrylic rubber can be determined by the following method.

Methyl ethyl ketone is added to A grams of an acrylic rubber sample, which is stirred at the boiling point of methyl ethyl ketone for 3 hours. Thereafter, the insolubles are centrifuged from the solution and dried to obtain B grams of solid matter. Then, the gel fraction content can be determined as:

$$Gel\ Fraction\ Content = B/A \times 100\ (\%).$$

The copolymerization of the acrylic ester with the polyfunctional monomer at the first step yields a copolymer in an amount of 55-90 parts by weight, preferably 60-85 parts by weight per 100 parts by weight of the final polymer composition.

Although crosslinked, the thus formed acrylic rubber component behaves just like rubber, forming soft segments in the thermoplastic elastomer and so imparting an elastomeric property to it.

(b) Preparation of Copolymer Component of Methacrylate Ester with Maleimide—Second Step I] Starting Materials 1) Methacrylate Ester The methacrylate esters used at the second step of preparing a methacrylate ester/maleimide copolymer in the process for producing thermoplastic elastomers according to the present invention are selected from esters of methacrylic acid with alcohol components having 1-15, preferably 1-10 carbon atoms.

Preferable examples of such methacrylate esters are methyl methacrylate, ethyl methacrylate, isobornyl methacrylate, cyclohexyl methacrylate, phenethyl methacrylate, bornyl methacrylate and adamantyl methacrylate.

Among these, methyl and isobornyl methacrylates are preferred, and methyl methacrylate is particularly preferred. The methacrylate esters may be used alone or in combination of two or more.

2) Maleimide

Maleimides used for copolymerization with the methacrylate ester or esters are maleimide and its N-substituted derivatives. Examples may include maleimide, N-methylmaleimide, N-phenylmaleimide, N-(2-methylphenyl)maleimide, N-(2-chlorophenyl) maleimide, N-(2,6-dimethylphenyl) maleimide, N(2,6-diethylphenyl) maleimide, N-(4-hydroxyphenyl) maleimide, N-(4-carboxyphenyl) maleimide and N-cyclohexylmaleimide. Among these, N-phenylmaleimide and N-cyclohexylmaleimide are preferred, and N-cyclohexylmaleimide is most preferred. The maleimides may be used alone or in combination of two or more.

In addition to the methacrylate esters and maleimides, other monomers copolymerizable with them, e.g. styrene, methacrylic acid and acrylonitrile, may be used in such a range that the effect of this invention is achievable, preferably in an amount of at most 20% by weight.

II] Preparation

The methacrylate esters and maleimides are added to the crosslinked acrylic rubber prepared at the first step, and are then copolymerized in the presence of a radical polymerization catalyst to form a methacrylate ester/maleimide copolymer. To this end, use may be made of any one of copolymerization techniques so far known in the art.

The copolymerization techniques used include solution polymerization carried out in an organic solvent such as toluene or xylene; suspension or emulsion polymerization carried out in an aqueous medium; solventless bulk polymerization carried out in the absence of any medium; and the like. Preferable in connection with the first step, however, is the heterogeneous polymerization technique using water as a medium—used at the first step, i.e. the suspension or emulsion polymerization technique.

More specifically, the methacrylate ester and maleimide, optionally together with 0.001-10 parts by weight, preferably 0.01-5 parts by weight based on 100 parts by weight of the sum of methacrylate ester and maleimide, of the chain transfer agent such as mercaptan and α-methylstyrene dimer, are added to the reaction product obtained at the first step of polymerization and crosslinking of the acrylic ester, when the unreacted monomer content reaches 10% by weight or lower, preferably 5% by weight or lower, so as to carry out further polymerization (the second step).

The quantitative ratio of the methacrylate ester and maleimide are determined such that the resulting copolymer has a glass transition temperature of 110° C. or higher, preferably 130° C. or higher, more preferably 140° C. or higher.

Thus, generally 90-5% by weight, preferably 80-20% by weight of the methacrylate ester is used with generally 10-95% by weight, preferably 20-80 % by weight of the maleimide.

As the maleimide unit content of the copolymer increases, the glass transition temperature increases. Thus, when the maleimide content is below the above-mentioned lower limit, the glass transition temperature and heat resistance of the copolymer are less improved, while the moldability of the resulting product deteriorates seriously at a maleimide content exceeding the above-mentioned upper limit.

At the second step, the polymerization should be effected such that the amount of the copolymer is in the range of 45-10 parts by weight with respect to 55-90 parts by weight of the crosslinked acrylic rubber, preferably in the range of 40-15 parts by weight with respect to 60-85 parts by weight of the crosslinked acrylic rubber (the total amounting to 100 parts by weight). Too small or large an amount of the crosslinked acrylic rubber is unpreferred, since the resulting product becomes poor in flexibility in the case of the former and deteriorates in moldability in the case of the latter.

Throughout the disclosure, it is understood that the term "methacrylate ester/maleimide copolymer" includes not only a copolymer of the methacrylate ester with the maleimide but also a graft copolymer grafted on the cross-linked acrylic rubber. Preferably, that graft copolymer accounts for 20% by weight or lower of the thermoplastic elastomer in total.

It is here noted that a product containing such a graft copolymer shows better physical properties.

At the second step, water, emulsifying agents, radical polymerization initiators, etc. may be additionally used, if required. Such materials as methacrylate esters, maleimides, emulsifier agents, radical polymerization catalysts, chain transfer agents and water may be fed to a reactor in bulk, in proportions or in continuous manners. Preferable, however, is to feed separately to the reactor a mixture comprising the methacrylate ester, maleimide and chain transfer agent and the radical polymerization catalyst in proportions or in continuous manners.

The polymerization at the second step is carried out at a temperature of generally 50°-120° C., preferably 60°-100° C. for a period of time of usually 1-12 hours, preferably about 3-10 hours.

The product may be recovered by methods ordinarily used with this type of polymerization. For instance, an aqueous solution of a coagulant such as salt, calcium chloride or magnesium chloride is supplied under agitation to the reaction mixture after the completion of the polymerization at the second step, thereby coagulating a composition mainly containing the resulting polymer composition. Subsequent filtration, washing and drying gives the end thermoplastic elastomer.

The thus obtained methacrylate ester/maleimide copolymer component forms hard segments in the thermoplastic elastomer, imparting moldability to it and improving its resistance to heat and oils.

As can be appreciated from the foregoing, the following two processes for producing thermoplastic elastomers are preferred embodiments of the process of the present invention.

One process is characterized in that the acrylic ester is polymerized in a heterogeneous system, in which water is used as a medium, at a temperature of 0°-30° C. in the presence of a polyfunctional monomer having at least two ethylenically unsaturated bonds in its molecule, thereby forming a crosslinked acrylic rubber having a glass transition temperature of 0° C. or lower in an amount of 55-90 parts by weight per 100 parts by weight of the final polymer composition, and a methacrylate ester and a maleimide are then added to the crosslinked acrylic rubber to carry out copolymerization, thereby forming a methacrylate ester/maleimide copolymer having a glass transition temperature of 110° C. or higher in an amount of 45-10 parts by weight per 100 parts by weight of the final polymer composition.

This process, in which the polymerization of the acrylic ester carried out in the presence of the polyfunctional monomer is performed at a temperature of 0°-30° C. in a heterogeneous polymerization system using water as a medium, makes it possible to produce a thermoplastic elastomer which is softer, and yet higher in tensile strength and smaller in compression set than that produced by other processes without recourse to such a polymerization manner and conditions as defined above.

Another or the second preferable process is characterized in that the acrylic ester is polymerized in a heterogeneous system, in which water is used as a medium, at a temperature of 0°-100° C. in the presence of a polyfunctional monomer having at least two ethylenically unsaturated bonds in its molecule and a chain transfer agent, thereby forming a crosslinked acrylic rubber having a glass transition temperature of 0° C. or lower in an amount of 55-90 parts by weight per 100 parts by weight of the final polymer composition, and a methacrylate ester and a maleimide are then added to the crosslinked acrylic rubber to carry out copolymerization, thereby forming a methacrylate ester/maleimide copolymer having a glass transition temperature of 110° C. or higher in an amount of 45-10 parts by weight per 100 parts by weight of the final polymer composition.

This process, in which the polymerization of the acrylic ester is performed in a heterogeneous polymerization system using water as a medium in the presence of the polyfunctional monomer and chain transfer agent, makes it possible to produce a thermoplastic elastomer which is superior in moldability to that produced by other processes without recourse to such a polymerization manner and conditions as defined above.

Thus, it has unexpectedly been found that by using the chain transfer agent in combination with the crosslinking agent in the first reaction step of making the crosslinked rubber, it is possible to remarkably improve the moldability of the final thermoplastic elastomer product with no substantial drop of the gel fraction content.

(3) Structure of Thermoplastic Elastomer

Electrophotography indicates that the thus obtained thermoplastic elastomer of the present invention is of an island sea structure.

Thus, the elastomer comprises particle crosslinked acrylic rubber forming the islands and the methacrylate ester/maleimide copolymer forming the sea. Although the particles of the crosslinked acrylic rubber forming the islands are not critical in size, they have an average particle size of generally 15 μm or less, preferably 7 μm or less, more preferably 0.07-1 μm and take spherical, amorphous or other forms. The islands take a major portion of the elastomer, because the monomer forming them is used in excess.

[II] Use of the Thermoplastic Elastomer

Excelling in not only resistance to heat and oils but also moldability, the thermoplastic elastomer according to the present invention may take various forms including extrudates, blow moldings and injection moldings and, by way of example alone, may be used as boots such as rack and pinion boots, sealing materials, automotive heat- and oil-resistant functional parts such as hoses and tubes, various heat- and oil-resistant cable coating materials and optical cable coating materials.

When the thermoplastic elastomers produced according to the present invention are practically used, the following additional components may be incorporated therein in such an amount that the effect of the present invention is achievable, e.g. in an amount up to 50 % by weight, preferably up to 30 % by weight.

Such additional components, for instance, may include resins of high polarity such as those based on polyamide, polyester, polyphenylene ether, polyoxymethylene, polycarbonate, polyphenylene sulfide, acrylate, ABS and styrene/maleimide; inorganic fillers such as metal oxides illustratively represented by silica, alumina, titania, zinc oxide and magnesium oxide; calcium carbonate; kaolin; mica; talc; asbestos; silicates (calcium and aluminium silicates); potassium titanate; whiskers such as boron carbide whisker; various pigments and colorants such as carbon black; and oxidation/degradation preventives.

EXPERIMENTAL EXAMPLES

The present invention will now be explained in more detail with reference to the following examples and comparative examples in which, otherwise instructed, the unit "part(s)" is given by weight.

Gel fraction content and physical properties were measured as follows.

Gel Fraction Content

Three hundred (300) ml of methyl ethyl ketone were added to about 1 gram or, precisely, A grams of acrylic rubber, which was then heated under agitation at the boiling temperature of methyl ethyl ketone for three hours. Thereafter, the insolubles were centrifuged out of the solution and dried to obtain B grams of insoluble matter on dry basis. Then, the gel fraction content was calculated from:

$$Gel\ Fraction\ Content = (B/A) \times 100\ (\%).$$

Press Molding of Test Pieces for Measuring Physical Properties

Performed at 200° C. with a pressing machine.

Hardness

Measured according to JIS-K 6301-A.

Compression Set

Measured at 70° C. for residual strain after 22 hours according to JIS-K 6301.

Tensile Strength and Elongation

Measured according to JIS-K 6301.

Oil Resistance

According to JIS-K6301, test pieces were immersed in JIS-No. 3 oil at 125° C. for 72 hours to measure their volume swell ($\Delta V$).

Glass Transition Temperature

Measured by the determination of viscoelasticity. More specifically, the glass transition temperature—expressed by the peak value of tan δ—was measured at a frequency of 1 Hz ($2\pi$rad/sec.) and a heating rate of 1° C./min. with a mechanical spectrometer Type RMS605 made by Rheometrics Co., Ltd.

Melt Flow Rate (MFR)

Measured at 230° C. under a load of 10 kg according to JIS K 6758.

EXAMPLE 1

First Step (of preparing crosslinked acrylic rubber particles)

Added to 140 parts of ion exchanged water were 2.8 parts of sodium lauryl sulfate as an emulsifying agent and 0.14 parts of potassium persulfate as an polymerization initiator, and the polymerization system was purged of oxygen by nitrogen gas.

Then, a liquid mixture of 70 parts of ethyl acrylate (EA for short) and 0.7 parts of triallyl isocyanurate (TAIC for short) was continuously supplied to the polymerization system over two hours, while its internal temperature was regulated to 50° C., to carry out emulsion polymerization of EA.

After the supply of the liquid mixture had been completed, a further 5-hour reaction was continued while the system was maintained at an internal temperature of 50° C.

Gas chromatography of a part of the reaction mixture indicated a conversion of 99%.

By measurement, the crosslinked acrylic rubber was found to have a gel fraction content of 93% and an average particle size of 0.3 μm.

Second Step (of preparing a methacrylate ester/maleimide copolymer)

Added to the latex formed at the first step were 60 parts of ion exchanged water and 0.3 parts of sodium lauryl sulfate. This system was then heated to 70° C., to which a liquid mixture of 21 parts of methyl methacrylate (MMA for short), 9 parts of N-cyclohexyl-maleimide (CMI for short) and 0.6 part of α-methylstyrene dimer (α-MSD for short) as a molecular weight regulator and 12 parts of a 1% aqueous solution of potassium persulfate were simultaneously supplied under agitation over 2 hours through the respective feed lines, thereby copolymerizing MMA with CMI in the presence of the crosslinked acrylic rubber latex.

After the supply of the starting mixture had been completed, a further 6-hour reaction was continued, during which the polymerization system was maintained at a reaction temperature of 70° C.

The monomer conversion at the second step was 95%. After cooling down to 20° C., the obtained reaction mixture was added dropwise to a stirred 1.5% aqueous solution of calcium chloride for salting-out. The coagulated reaction product was filtered, washed with water and methanol and finally dried in vacuo at 75° C.

The dried product, along with 1 part of an antioxidant Irganox 1010, was kneaded together at 180° C and 50 r.p.m. for 5 minutes with a biaxial kneader and then press-molded to measure its physical properties.

The results are shown in Table 1.

EXAMPLES 2-7

The procedures of Example 1 were followed with the exception that the acrylic esters, polyfunctional monomers, methacrylate esters, maleimides and molecular weight regulators set out in Table 1 were used at the ratios set out therein.

The results are shown and illustrated in Table 1 and FIG. 1.

FIG. 1 illustrates the temperature dependences of the modulus of elasticity (G') and tan δ of the thermoplastic elastomer obtained in Example 2, as measured with a viscoelasticity measuring device.

From FIG. 1, it is found that two peaks of tan δ lie at −8° C. and 150° C., respectively, corresponding to the glass transition temperatures of the acrylic rubber and MMA/N-phenylmaleimide (PMI for short) copolymer.

It is also noted that there is a less change in the modulus of elasticity (G') in the range of normal temperature to 150° C. These viscoelastic properties imply that the product of Ex. 2 behaves as a thermoplastic elastomer in itself.

EXAMPLE 8

The procedure of Example 7 was followed with the exception that at the second step 27 parts of isobornyl methacrylate was used in place of MMA and kneading and pressing were carried out at 230° C.

The results are shown in Table 1.

EXAMPLE 9

The procedure of Example 1 was followed with the exception that at the second reaction step the amounts of MMA and CMI were changed to 15 parts and 15 parts, respectively.

The results are shown in Table 1.

TABLE 1

| | Examples | | | | | | | | |
|---|---|---|---|---|---|---|---|---|---|
| | 1 | 2 | 3 | 4 | 5 | 6 | 7 | 8 | 9 |
| First Step | | | | | | | | | |
| Preparation of crosslinked acrylic rubber particles | | | | | | | | | |

TABLE 1-continued

| | Examples | | | | | | | | |
|---|---|---|---|---|---|---|---|---|---|
| | 1 | 2 | 3 | 4 | 5 | 6 | 7 | 8 | 9 |
| Acrylic ester (part) | EA70 | EA70 | EA85 | EA60 | BA70 | EA50 MEA20 | EA70 | EA70 | EA70 |
| Polyfunctional monomer (part) | TAIC 0.7 | TDA 0.7 | TPA 0.7 | TAIC 0.6 | TAIC 0.7 | TAIC 0.7 | TAIC 0.7 | TAIC 0.7 | TAIC 0.7 |
| Conversion (%) | 99 | 99 | 99 | 99 | 98 | 99 | 99 | 99 | 99 |
| Gel fraction content (%) | 93 | 85 | 96 | 94 | 94 | 95 | 93 | 93 | 93 |
| Second Step | | | | | | | | | |
| Preparation of methacrylate Ester/maleimide copolymer | | | | | | | | | |
| Methacrylate ester (part) | MMA 21 | MMA 21 | MMA 10 | MMA 28 | MMA 21 | MMA 21 | MMA 27 | IBM 27 | MMA 15 |
| Maleimide Compound (part) | CMI 9 | PMI 9 | CMI 5 | CMI 12 | CMI 9 | CMI 9 | CMI 3 | CMI 3 | CMI 15 |
| Molecular weight regulator (part) | α-MSD 0.6 | α-MSD 0.6 | α-MSD 0.3 | α-MSD 0.8 | α-MSD 0.6 | α-MSD 0.6 | α-MSD 0.6 | α-MSD 0.6 | α-MSD 0.6 |
| Conversion (%) | 95 | 94 | 94 | 95 | 95 | 94 | 96 | 94 | 93 |
| Physical Properties | | | | | | | | | |
| Glass Transition Temp. (°C.) | | | | | | | | | |
| Lower side | −8 | −8 | −8 | −8 | −40 | −21 | −8 | −8 | −8 |
| Higher side | 140 | 150 | 140 | 140 | 140 | 140 | 120 | 185 | 165 |
| Hardness | 90 | 90 | 55 | 96 | 89 | 90 | 90 | 91 | 90 |
| Tensile Strength (kg/cm$^2$) | 96 | 84 | 60 | 98 | 75 | 93 | 94 | 91 | 97 |
| Elongation (%) | 390 | 410 | 430 | 260 | 380 | 350 | 400 | 370 | 350 |
| Oil Resistance (ΔV; %) | 12 | 12 | 13 | 10 | 28 | 12 | 14 | 16 | 14 |
| Compression Set (%) | 69 | 78 | 51 | 80 | 65 | 68 | 69 | 68 | 68 |

In Table 1, the abbreviations mean the following compounds.
EA: ethyl acrylate
TAIC: triallyl isocyanurate
MMA: methyl methacrylate
CMI: N-cyclohexylmaleimide
α-MSD: α-methylstyrene dimer
TDA: tetraethylene glycol diacrylate
PMI: N-phenylmaleimide
TPA: trimethylolpropane triacrylate
BA: n-butyl acrylate
MEA: 2-methoxyethyl acrylate
IBM: isobornyl methacrylate

EXAMPLE 10

Only the first reaction step of Example 1 was repeated, using 68 parts of EA and 2 parts of allyl glycidyl ether in lieu of 70 parts by weight of EA and 0.7 part of TAIC.

After the completion of the reaction, the polymer product was recovered by salting-out with an aqueous solution of calcium chloride, washed with water and dried to obtain an uncrosslinked acrylic rubber.

One hundred (100) parts of this uncrosslinked acrylic rubber, along with 1 part of stearic acid, 2 parts of a lubricant Interstap G-8205 and 2 parts of ammonium benzoate as a crosslinking accelerator, were kneaded together at 50° C. for 2 minutes by means of an 8inch open roll, then subjected to press vulcanization at 170° C. for 20 minutes (first vulcanization) and then held in an oven at 170° C for 2 hours, for a further or second vulcanization, thereby obtaining a crosslinked acrylic rubber having a gel fraction content of 97%.

This crosslinked acrylic rubber was pulverized at the temperature of liquid nitrogen to obtain a powdery crosslinked acrylic rubber having an average particle size of 5.8 μm.

On the other hand, only the second reaction step of Example 1 was carried out in the absence of an emulsion of ethyl acrylate polymer to obtain a powdery MMA/CMI copolymer having a CMI unit content of 30%.

Sixty (60) parts of the powdery crosslinked acrylic rubber and 40 parts of the powdery MMA/CMI polymer, along with 1 part of an antioxidant Irganox 1010, were kneaded together at 180° C. and 50 r.p.m. for 5 minutes with the use of a biaxial kneader to obtain a thermoplastic elastomer with such properties as set out in Table 2.

TABLE 2

| Glass transition temp. | |
|---|---|
| Lower side | −8 |
| Higher side | 140 |
| Hardness | 96 |
| Tensile strength (kg/cm$^2$) | 82 |
| Elongation (%) | 220 |
| Oil resistance (ΔV; %) | 10 |
| Compression set (%)[1] | 75 |

COMPARATIVE EXAMPLE 1

Followed was the procedure of Ex. 1 of Japanese Patent Kokai No. 62(1987)-209113 wherein a single stage reaction, rather than a two-stage reaction, is carried out.

More specifically, 2.6 parts of sodium dodecylbenzene-sulfonate, 80 parts of a 2% aqueous solution of potassium persulfate and 2 parts of a 0.1% aqueous solution of sodium hydrogen sulfate were added to 300 parts of ion exchanged water. Added to this solution was a liquid mixture of 140 parts of EA, 0.21 part of tetraethylene glycol diacrylate (TDA for short), 42 parts of MMA and 18 parts of PMI, and emulsion polymerization was carried out at 63.5° C., for 4 hours.

The temperature dependences of the modulus of elasticity (G') and tan δ of the resulting product were determined with a viscoelasticity measuring device. The data are illustrated in FIG. 2.

From FIG. 2, it is found that there is only a single peak of tan δ at 35° C. (glass transition temperature) in the region of −100° C. to 200° C. with an incidental great change in the modulus of elasticity (G') in the range of normal temperature to 100° C. These viscoelastic properties present evidence of the product being not a thermoplastic elastomer.

EXAMPLE 11

First Step (of preparinq crosslinked acrylic rubber)

Added to a reactor substituted therein with nitrogen were 140 parts of ion exchanged water, 0.014 part of sodium hydrosulfite as a deoxygenizer, 1.4 parts of sodium dodecylbenzenesulfonate and 0.7 part of a condensate of sodium naphthalenesulfonate with formalin as emulsifying agents, 0.21 part of sodium sulfate as an emulsion stabilizer, 0.014 part of tetrasodium ethylenediaminetetraacetate and 0.00035 part of ferric sodium ethylenediaminetetraacetate as polymerization promotors and 0.014 part of sodium formaldehyde sulfoxylate as a reducing agent of a radical initiator.

One-tenths of a liquid mixture (monomer mixture) of 70 parts of EA and 0.7 part of TAIC was further added under agitation to this system at a temperature of 3° C., and the system was emulsified.

Then, to the rest of the monomer mixture, was added 0.007 part of p-menthane hydroperoxide as an oxidizing agent of a radical initiator, which was then continuously supplied to the above emulsified system over about 2 hours, while the reaction system was maintained under agitation at an internal temperature of 5° C. by cooling. Even after the supply of the monomer mixture had been completed, a further 5-hour reaction was continued while the system was maintained at 5° C., followed by an additional 2-hour reaction at a temperature elevated to 30° C.

Gas chromatography of a part of the thus obtained reaction mixture indicated a conversion of 99%.

By measurement, this crosslinked acrylic rubber product was found to have a gel fraction content of 94% and an average particle size of 0.3 μm.

Second Step (of preparinq an methacrylate ester/maleimide copolymer)

Added to the latex formed at the first step were 60 parts of ion exchanged water and 0.3 part of sodium lauryl sulfate. This system was then heated to 70° C., to which a liquid mixture of 21 parts of MMA, 9 parts of CMI and 0.6 part of α-MSD as a molecular weight regulator and 12 parts of a 1% aqueous solution of potassium persulfate were simultaneously supplied under agitation over 2 hours through the respective feed lines, thereby copolymerizing MMA with CMI in the presence of the crosslinked acrylic rubber emulsion.

After the supply of the starting mixture had been completed, a further 6-hour reaction was continued, during which the polymerization system was maintained at a reaction temperature of 70° C.

The monomer conversion at the second step was 95%. After cooling down to 20° C., the obtained reaction liquid mixture was added dropwise to a stirred 1.5% aqueous solution of calcium chloride for salting-out. The coagulated reaction product was filtered, washed with water and methanol and finally dried in vacuo at 75° C.

The dried product, along with 1 part of an antioxidant Irganox 1010, was kneaded together at 180° C. and 50 r.p.m. for 5 minutes with a biaxial kneader and then press-molded to measure its physical properties.

The results are shown in Table 3.

EXAMPLES 12 and 13

The procedures of Example 10 were followed with the exception that the acrylic esters, polyfunctional monomers, methacrylate esters, maleimides and molecular weight regulators set out in Table 3 were used at the ratios set out therein.

The results are shown in Table 3.

EXAMPLE 14

The procedure of Example 10 was followed with the exception that at the first step 1.4 parts of sodium lauryl sulfate was used in place of sodium dodecylbenzenesulfonate and the amounts of EA and TAIC were changed to 60 parts and 0.6 part, respectively, and at the second step the amounts of MMA, CMI and α-MSD were changed to 28 parts, 12 parts and 0.8 part, respectively.

The results are shown in Table 3.

EXAMPLE 15

The procedure of Example 10 was followed with the exception that at the first step 2 parts of ammonium polyoxyethylene nonylphenyl ether sulfate were used in lieu of sodium dodecylbenzenesulfonate, the condensate of sodium naphthalenesulfonate with formalin and sodium sulfate and 70 parts of n-butyl acrylate (BA for short) were used in place of EA.

The results are shown in Table 3.

EXAMPLE 16

The procedures of Example 10 was followed with the exception that at the first step 0.7 part of polyoxyethylene octylphenyl ether was added as a further emulsifying agent and 50 parts of EA and 20 parts of 2methoxyethyl acrylate (MEA for short) were used in place of 70 parts of EA.

The results are shown in Table 3.

EXAMPLE 17

The procedure of Example 10 was followed with the exception that at the second step the amounts of MMA and CMI were changed to 27 parts and 3 parts, respectively.

The results are shown in Table 3.

EXAMPLE 18

The procedure of Example 17 was followed with the exception that at the second step 27 parts of isonorbonyl methacrylate were employed in lieu of MMA and kneading and pressing were performed at 230° C.

The results are shown in Table 3.

EXAMPLE 19

The procedure of Example 10 was followed with the exception that at the second step the amounts of MMA and CMI were changed to 15 parts and 15 parts, respectively.

The results are shown in Table 3.

TABLE 3

| | Examples | | | | | | | | |
|---|---|---|---|---|---|---|---|---|---|
| | 11 | 12 | 13 | 14 | 15 | 16 | 17 | 18 | 19 |
| First Step | | | | | | | | | |
| Preparation of crosslinked acrylic rubber particles | | | | | | | | | |

TABLE 3-continued

| | Examples | | | | | | | | |
|---|---|---|---|---|---|---|---|---|---|
| | 11 | 12 | 13 | 14 | 15 | 16 | 17 | 18 | 19 |
| Acrylic ester (part) | EA70 | EA70 | EA85 | EA60 | BA70 | EA50 MEA20 | EA70 | EA70 | EA70 |
| Polyfunctional monomer (part) | TAIC 0.7 | TDA 0.7 | TPA 0.7 | TAIC 0.6 | TAIC 0.7 | TAIC 0.7 | TAIC 0.7 | TAIC 0.7 | TAIC 0.7 |
| Conversion (%) | 99 | 99 | 99 | 98 | 98 | 98 | 99 | 99 | 99 |
| Gel fraction content (%) | 94 | 83 | 96 | 94 | 96 | 95 | 94 | 94 | 94 |
| Second Step | | | | | | | | | |
| Preparation of methacrylate Ester/maleimide copolymer | | | | | | | | | |
| Methacrylate ester (part) | MMA 21 | MMA 21 | MMA 10 | MMA 28 | MMA 21 | MMA 21 | MMA 27 | IBM 27 | MMA 15 |
| Maleimide Compound (part) | CMI 9 | PMI 9 | CMI 5 | DMI 12 | CMI 9 | DMI 9 | CMI 3 | CMI 3 | CMI 15 |
| α-MSD (part) | 0.6 | 0.6 | 0.3 | 0.8 | 0.6 | 0.6 | 0.6 | 0.6 | 0.6 |
| Conversion (%) | 95 | 95 | 94 | 95 | 95 | 94 | 96 | 95 | 93 |
| Physical Properties | | | | | | | | | |
| Glass Transition Temp. (°C.) | | | | | | | | | |
| Lower side | −8 | −8 | −8 | −8 | −40 | −21 | −8 | −8 | −8 |
| Higher side | 140 | 150 | 141 | 140 | 140 | 140 | 120 | 185 | 165 |
| Hardness | 85 | 90 | 53 | 98 | 89 | 90 | 87 | 90 | 90 |
| Tensile Strength (kg/cm$^2$) | 118 | 98 | 82 | 128 | 93 | 115 | 115 | 114 | 108 |
| Elongation (%) | 280 | 400 | 380 | 150 | 300 | 290 | 310 | 290 | 270 |
| Oil Resistance (ΔV; %) | 12 | 12 | 12 | 10 | 28 | 12 | 13 | 18 | 11 |
| Compression Set (%) | 65 | 75 | 39 | 78 | 64 | 65 | 67 | 65 | 65 |

EXAMPLE 20

First Step (of preparing crosslinked acrylic rubber particles)

Added to 140 parts of ion exchanged water were 2.8 parts of sodium lauryl sulfate as an emulsifying agent and 0.035 part of potassium persulfate as an polymerization initiator, and the polymerization system was purged of oxygen by nitrogen gas.

Then, a liquid mixture of 70 parts of EA, 0.7 part of TAIC and 0.07 part of t-dodecyl mercaptan (t-DM for short) as a chain transfer agent was continuously supplied under agitation to the polymerization system over two hours, while its internal temperature was regulated to 50° C., to carry out emulsion polymerization of EA.

After the supply of the liquid mixture had been completed, a further 5-hour reaction was continued while the system was maintained at an internal temperature of 50° C.

Gas chromatography of a part of the reaction mixture indicated that the conversion was 99%.

By measurement, the crosslinked acrylic rubber was found to have a gel fraction content of 92% and an average particle size of 0.2 μm.

Second Step (of preparinq a methacrylate ester maleimide copolymer)

Added to the emulsified polymerization liquid formed at the first step were 60 parts of ion exchanged water and 0.3 part of sodium lauryl sulfate. This system was then heated to 90° C., to which a liquid mixture of 21 parts of MMA, 9 parts of CMI and 0.6 part of α-MSD as a molecular weight regulator and 12 parts of a 1% aqueous solution of potassium persulfate were simultaneously supplied under agitation over 2 hours through the respective feed lines, thereby copolymerizing MMA with CMI in the presence of the crosslinked acrylic rubber emulsion. After the supply of the starting mixture had been completed, a further 6-hour reaction was continued, during which the polymerization system was maintained at a reaction temperature of 70° C.

The monomer conversion at the second step was 95%. After cooling down to 20° C., the obtained reaction liquid mixture was added dropwise to a stirred 1.5% aqueous solution of calcium chloride for salting-out. The coagulated reaction product was filtered, washed with water and methanol and finally dried in vacuo at 75° C.

The dried product, along with 1 part of an antioxidant Irganox 1010, was kneaded together at 180° C and 50 r.p.m. for 5 minutes with a biaxial kneader and then press-molded to measure its physical properties.

The results are shown in Table 4.

EXAMPLES 21 AND 22

The procedures of Example 20 were followed with the exception that the amount of the chain transfer agent t-DM was varied. The results are shown in Table 4.

COMPARATIVE EXAMPLE 2

The procedure of Example 20 was repeated in the absence of any polyfunctional monomer. The results are shown in Table 4.

It is apparent from Table 4 that the absence of polyfunctional monomer causes the product not only to have a melt flow rate too high to deteriorate in moldability but also to degenerate seriously in tensile strength and compression set; it can never be used as a thermoplastic elastomer.

EXAMPLES 23-27

The procedures of Examples 20 were repeated, provided that different types of monomers were used at varied quantitative ratios with different types of chain transfer agents. The results are shown in Table 4 with the conditions applied.

EXAMPLE 28

The procedure of Example 20 was repeated with the following modification to the first step. The results are shown in Table 4.

First Step

Added to a reactor substituted therein with nitrogen were 140 parts of ion exchanged water, 0.014 part of sodium hydrosulfite as a deoxygenizer, 1.4 parts of sodium dodecylbenzenesulfonate and 0.7 part of a condensate of sodium naphthalenesulfonate with formalin as emulsifying agents, 0.21 part of sodium sulfate as an emulsion stabilizer, 0.014 part of tetrasodium ethylenediaminetetraacetate and 0.00035 part of ferric sodium ethylenediaminetetraacetate as polymerization promotors and 0.014 part of sodium formaldehyde sulfoxylate as a reducing agent of a radical initiator.

One-tenths of a liquid mixture (monomer mixture) of 70 parts of EA, 0.7 part of TAIC and 0.07 part of t-DM was further added under agitation to this system at a temperature of 3° C. and the system was emulsified.

Then, to the rest of the monomer mixture was added 0.007 part of p-menthane hydroperoxide as an oxidizing agent of a radical initiator, which was then continuously supplied to the above emulsified system over about 2 hours, while the reaction system was maintained under agitation at an internal temperature of 5° C. by cooling. Even after the supply of the monomer mixture had been completed, a further 5-hour reaction was continued while the system was maintained at 5° C., followed by an additional 2-hour reaction at a temperature elevated to 30° C.

Gas chromatography of a part of the thus obtained reaction mixture indicated a conversion of 99%.

By measurement, it was also found to have a gel fraction content of 93%.

TABLE 4

| | Examples | | | | | | | | | Comp. Ex. 1 | Comp. Ex. 2 |
|---|---|---|---|---|---|---|---|---|---|---|---|
| | 20 | 21 | 22 | 23 | 24 | 25 | 26 | 27 | 28 | | |
| First Step | | | | | | | | | | | |
| Preparation of crosslinked acrylic rubber particles | | | | | | | | | | | |
| Acrylic ester (part) | EA70 | EA70 | EA70 | EA85 | EA50 MEA20 | BA70 | EA70 | EA70 | EA70 | EA70 | EA70 |
| Polyfunctional monomer (part) | TAIC 0.7 | TAIC 0.7 | TDA 0.7 | TPA 0.7 | TAIC 0.7 | TAIC 0.7 | TAIC 0.7 | TAIC 0.7 | TAIC 0.7 | TAIC 0.7 | — |
| Chain transfer agent (part) | t-DM 0.07 | t-DM 0.035 | t-DM 0.14 | t-DM 0.14 | n-DM 0.07 | TGA 0.07 | t-DM 0.07 | t-DM 0.07 | t-DM 0.07 | — | t-DM 0.07 |
| Conversion (%) | 99 | 99 | 98 | 99 | 98 | 98 | 99 | 99 | 99 | 99 | 99 |
| Gel fraction content (%) | 92 | 93 | 90 | 95 | 95 | 93 | 92 | 92 | 93 | 93 | 1.3 |
| Second Step | | | | | | | | | | | |
| Preparation of methacrylate Ester/maleimide copolymer | | | | | | | | | | | |
| Methacrylate ester (part) | MMA 21 | MMA 21 | MMA 21 | MMA 10.5 | MMA 21 | MMA 21 | MMA 21 | IBM 27 | MMA 21 | MMA 21 | MMA 21 |
| Maleimide Compound (part) | CMI 9 | CMI 9 | CMI 9 | CMI 4.5 | CMI 9 | CMI 9 | PMI 9 | CMI 3 | CMI 9 | CMI 9 | CMI 9 |
| Chain transfer agent (part) | α-MSD 0.6 | α-MSD 0.6 | α-MSD 0.6 | α-MSD 0.6 | α-MSD 0.6 | α-MSD 0.6 | α-MSD 0.6 | α-MSD 0.6 | α-MSD 0.6 | α-MSD 0.6 | α-MSD 0.6 |
| Conversion (%) | 95 | 95 | 95 | 95 | 95 | 95 | 94 | 95 | 95 | 95 | 95 |
| Physical Properties | | | | | | | | | | | |
| Glass Transition Temp. (°C.) | | | | | | | | | | | |
| Lower side | −8 | −8 | −8 | −8 | −21 | −40 | −8 | −8 | −8 | −8 | −8 |
| Higher side | 140 | 140 | 140 | 140 | 140 | 140 | 150 | 185 | 140 | 140 | 140 |
| Hardness | 90 | 90 | 90 | 40 | 90 | 88 | 90 | 90 | 85 | 90 | 34 |
| MFR (g/10 min) | 3.5 | 0.4 | 27 | 17 | 3.0 | 5.3 | 4.1 | 2.4 | 6.1 | 0.01 | 670 |
| Tensile Strength (kg/cm$^2$) | 95 | 95 | 81 | 52 | 92 | 70 | 80 | 88 | 115 | 96 | 12 |
| Elongation (%) | 400 | 390 | 430 | 680 | 370 | 390 | 410 | 390 | 300 | 390 | 780 |
| Oil Resistance (ΔV; %) | 12 | 12 | 12 | 13 | 12 | 29 | 12 | 18 | 12 | 12 | 19 |
| Compression Set (%) | 70 | 70 | 82 | 55 | 70 | 66 | 79 | 68 | 67 | 69 | 100 |

In Table 4, three abbreviations which have not been referred to in Table 1 mean the following compounds.
t-DM: t-dodecyl mercaptan
n-DM: n-dodecyl mercaptan
TGA: thioglycollic acid

What is claimed is:

1. A process for producing a thermoplastic elastomer which comprises:
    polymerizing an acrylic ester in the presence of a polyfunctional monomer having in its molecule at least two ethylenically unsaturated bonds, thereby forming a crosslinked acrylic rubber having a glass transition temperature of 0° C. or lower in an amount of 55-90 parts by weight per 100 parts by weight of the final polymer composition; and
    adding a methacrylate ester and a maleimide to the acrylic rubber so as to carry out copolymerization, thereby forming a methacrylate ester/maleimide copolymer having a glass transition temperature of 110° C or higher in an amount of 45-10 parts by weight per 100 parts by weight of the final polymer composition.

2. A process for producing a thermoplastic elastomer which comprises:

polymerizing an acrylic ester at a temperature of 0°-30° C. in a heterogeneous polymerization system using water as a medium in the presence of a polyfunctional monomer having in its molecule at least two ethylenically unsaturated bonds, thereby forming a crosslinked acrylic rubber having a glass transition temperature of 0° C. or lower in an amount of 55-90 parts by weight per 100 parts by weight of the final polymer composition; and adding a methacrylate ester and a maleimide to the acrylic rubber so as to carry out copolymerization, thereby forming a methacrylate ester/maleimide copolymer having a glass transition temperature of 110° C. or higher in an amount of 45-10 parts by weight per 100 parts by weight of the final polymer composition.

3. A process for producing a thermoplastic elastomer which comprises:

polymerizing an acrylic ester at a temperature of 0°-100° C. in a heterogeneous polymerization system using water as a medium in the presence of a polyfunctional monomer having in its molecule at least two ethylenically unsaturated bonds and a chain transfer agent, thereby forming a crosslinked acrylic rubber having a glass transition temperature of 0° C. or lower in an amount of 55-90 parts by weight per 100 parts by weight of the final polymer composition; and adding a methacrylate ester and a maleimide to the acrylic rubber so as to carry out copolymerization, thereby forming a methacrylate ester/maleimide copolymer having a glass transition temperature of 110° C. or higher in an amount of 45-10 parts by weight per 100 parts by weight of the final polymer composition.

4. The process according to claim 1, 2 or 3, wherein the acrylic ester is selected from the group consisting of ethyl acrylate, n-propyl acrylate, n-butyl acrylate, n-amyl acrylate, 2-methoxyethyl acrylate, 2-ethoxyethyl acrylate and 2-cyanoethyl acrylate.

5. The process according to claim 1, 2 or 3, wherein the polyfunctional monomer is a trifunctional monomer.

6. The process according to claim 2 or 3, wherein the heterogeneous polymerization system is an emulsion system.

7. The process according to claim 1, 2 or 3, wherein the methacrylate ester is methyl methacrylate or isobornyl methacrylate.

8. The process according to claim 1, 2 or 3, wherein the maleimide is N-phenylmaleimide or N-cyclohexylmaleimide.

9. The process according to claim 3, wherein the chain transfer agent is a mercaptan.

* * * * *